(12) United States Patent
Adamski

(10) Patent No.: US 6,698,822 B2
(45) Date of Patent: Mar. 2, 2004

(54) MOTOR VEHICLE WITH A RECEPTACLE ARRANGED IN AN END REGION OF THE MOTOR VEHICLE

(75) Inventor: Pawel Adamski, Sindelfingen (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 0 days.

(21) Appl. No.: 10/208,040

(22) Filed: Jul. 31, 2002

(65) Prior Publication Data

US 2003/0034670 A1 Feb. 20, 2003

(30) Foreign Application Priority Data

Aug. 18, 2001 (DE) .......................................... 101 40 674

(51) Int. Cl.[7] .............................................. B62D 25/08
(52) U.S. Cl. ............................... 296/203.02; 296/901.01
(58) Field of Search ................................ 296/193, 194, 296/195, 196, 197, 203.02, 901

(56) References Cited

U.S. PATENT DOCUMENTS

| 2,233,316 | A | * | 2/1941 | Klavik | 296/194 |
|---|---|---|---|---|---|
| 3,541,668 | A | * | 11/1970 | Wessells, III et al. | 296/193 |
| 3,894,608 | A | * | 7/1975 | Haenle | |
| 4,887,862 | A | * | 12/1989 | Bassi | 296/204 |
| 6,065,795 | A | * | 5/2000 | Forster et al. | 296/63 |
| 6,276,477 | B1 | * | 8/2001 | Ida | 296/197 |

FOREIGN PATENT DOCUMENTS

| DE | 3000666 | A1 | | 7/1981 | |
|---|---|---|---|---|---|
| DE | 3000666 | | * | 7/1981 | 296/195 |
| DE | 8130141.3 | | | 2/1983 | |
| EP | 0255749 | | * | 2/1988 | |
| EP | 0670257 | A1 | | 9/1995 | |
| EP | 0847912 | | * | 6/1998 | |
| GB | 705557 | | * | 3/1954 | 296/196 |
| JP | 34835 | | * | 2/1987 | 296/194 |
| JP | 235178 | | * | 9/1988 | 296/196 |

* cited by examiner

Primary Examiner—Dennis H. Pedder
(74) Attorney, Agent, or Firm—Crowell & Moring LLP

(57) ABSTRACT

A motor vehicle includes an end region and a receptacle arranged in the end region. The end region includes a pan made at least partially of a fiber reinforced plastic, and the pan functions as an impact deformable element.

20 Claims, 3 Drawing Sheets

MOTOR VEHICLE WITH A RECEPTACLE ARRANGED IN AN END REGION OF THE MOTOR VEHICLE

This application claims the priority of German Patent Document No. 101 40 674.6, filed Aug. 18, 2001, the disclosure of which is expressly incorporated by reference herein.

BACKGROUND AND SUMMARY OF THE INVENTION

The invention relates to a receptacle, which is arranged in an end region of the motor vehicle.

DE 30 00 666 A1 discloses a motor vehicle having a receptacle, as a trunk, which is formed by a pan. The pan is arranged in an end region of the motor vehicle and is made of plastic. The side walls of the trunk are sheet metal parts. The pan is located between two separate longitudinal members of the frame and a cross member connecting the ends of the longitudinal members. These members of the frame are usually made of metal.

An object of the invention is to simplify a motor vehicle of the aforementioned type and to optimize with respect to weight.

The object is achieved with the preferred embodiments of the present invention as described and claimed below.

The advantages of the invention include that the motor vehicle does not need deformable longitudinal members in the end region of the motor vehicle, since the pan, made of a fiber reinforced plastic, functions as an impact deformable element. Thus, the use of the fiber reinforced plastic saves weight not only due to the material, but also because there is no need, as stated above, for the metal longitudinal members of the frame. An additional advantage is that the impact deformable element, thus the pan, serves as the receptacle for baggage, motor vehicle parts or the like. The fiber reinforcement can be constructed of carbon and/or glass fibers.

According to a further embodiment of the invention, it is advantageous that there is no need for the conventional bumper mounting bracket (cross member). The bumper is fastened, according to the invention, to the attachments, installed in the pan. Thus, the pan, in particular its front wall, made of the fiber reinforced plastic, enables the attachment of the bumper.

The pan can be made as one piece, or as multiple parts, where the multi-part design is used especially for complicated pan contours.

The pan can be fastened to the motor vehicle body by an intermediate frame, which is made in particular of aluminum, especially an aluminum casting. Thus, the pan, forming the receptacle, can be connected easily to the vehicle body. However, the pan fastened directly to the body.

Other objects, advantages and novel features of the present invention will become apparent from the following detailed description of the invention when considered in conjunction with the accompanying drawings.

DETAILED DESCRIPTION OF THE DRAWINGS

Figure 1:
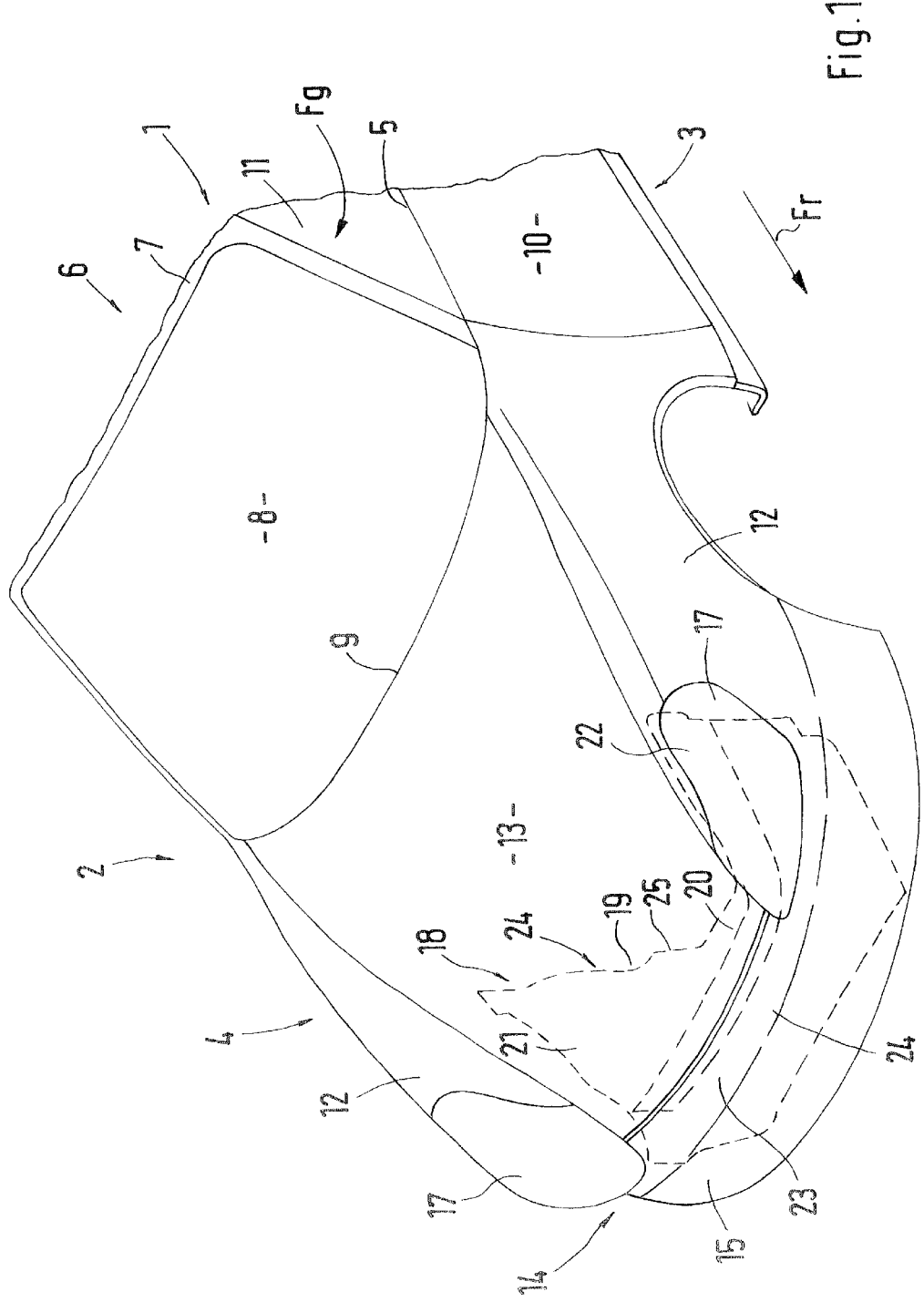
FIG. 1 shows a detail of the motor vehicle with a receptacle, provided in the front end of the vehicle.

FIG. 1 shows a motor vehicle 1, especially a passenger car, comprising a body 2 and a motor vehicle upper part 6, arranged above the belt line. The body includes a rear region (or a rear end region) (not shown) of the motor vehicle, a central part 3, and a front end region 4. The upper part 6 of the motor vehicle comprises a peripheral windshield frame 7, which encloses a windshield 8 and borders a cowl 9 in the area of the belt line 5. The central part 3 of the body 2 has side doors with a preferably frameless side window. FIG. 1 shows only one door 10 with its side window 11.

Figure 3:
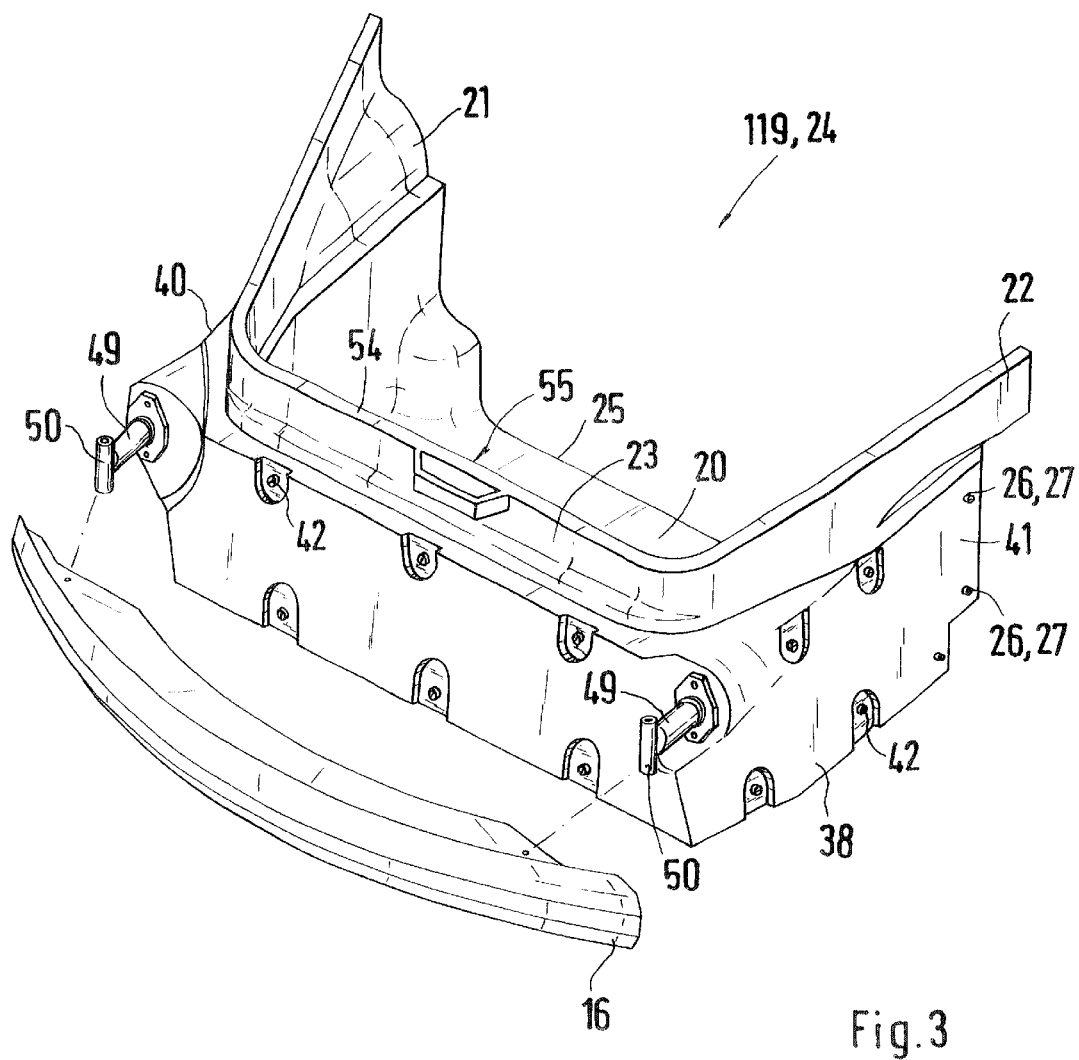
FIG. 3 depicts a receptacle-forming pan in a one piece design.

The front end region 4, arranged in front of the cowl 9 in the direction of vehicle travel Fr, comprises side fenders 12; a hood 13, which is to be opened and closed and is arranged between the fenders 12; and body paneling 15, forming the front end 14 of the motor vehicle, for a bumper 16 (FIG. 3). Headlights 17, which can be integrated into the fenders 12, are also installed in the front end region 4.

The front end 4 includes a receptacle 18, which is accessible by means of the hood 13 and serves preferably as the trunk. Of course, the receptacle 18 may be placed in the rear end region (not illustrated). The receptacle 18 is defined by a pan 19, which is received by the body 2 and/or is fastened to the body 2. The pan 19 has upright walls, but preferably has no rear wall and is open in the direction of the hood 13. "No rear wall" means that the pan is open on the side facing the passenger compartment Fg. Thus, the pan has a floor 20; two separate side walls 21 and 22, which run approximately vertically or are upright; and a front wall 23, which is adjacent to the motor vehicle front end 14 and which also runs approximately vertically and may be upright. The pan 19 is made at least partially of a fiber reinforced, in particular a carbon fiber reinforced, plastic. The pan 19 preferably is designed as an impact deformable element 24, which can also be called the crash box. One or more of the floor 2, the side walls 21 and 22, and the front wall 3 can be made of a fiber reinforced plastic. Preferably, the entire pan 19, thus the floor 20, the side walls 21 and 22, as well as the front wall 23, preferably made of the fiber reinforced plastic, are produced as one piece or multiple parts.

The pan 19 is connected to the body 2 at one or more of the end 25, the side walls 21 and 22, and the floor 23. Preferably, a vertically oriented wall (not illustrated) of the body 2 forms the rear wall of the pan 19 or of the receptacle 18. This wall can be a splash wall, which is arranged below the cowl 9 and belongs to the passenger compartment. Of course, it is also conceivable to provide the pan 19 with an integrated rear wall, preferably made of the fiber reinforced plastic. To fasten the pan 19 to the body 2, fastening elements 26, made preferably of a metal material, are installed into the walls, for example the floor 20, and/or the side walls 21 or 22 and/or the front wall 23. The fastening elements 26 may be formed by a sleeve H, which had an internal thread and into which the fasteners 27, having preferably an external thread, are screwed. Preferably there is an intermediate frame 28 for fastening the pan 19 to the body 2. The intermediate frame 28 is made, for example of an aluminum casting. The intermediate frame 28 is connected to the rear end 25 of the pan 19 with fastening elements 26 and fasteners 27. The intermediate frame 28 can have a U-shaped frame and can be connected to both the floor 20 and the side walls 21 and 22. As an alternative, the intermediate frame 28 can also be designed to run peripherally, as shown with the dashed line in FIG. 2. Furthermore, the intermediate frame 28 could have a rear wall for the pan 19. If the intermediate frame 28 is connected to the body 2, the intermediate frame 28 preferably has fastening through opening 29 for receiving screws or rivets, which fix the intermediate frame 28 to the body 2. The intermediate frame 28 serves to connect the pan 19 to the body 2, irrespective of whether the pan 19 is designed, according to FIG. 2, as multiple parts or, as shown in FIG. 3, as one piece.

Figure 2:
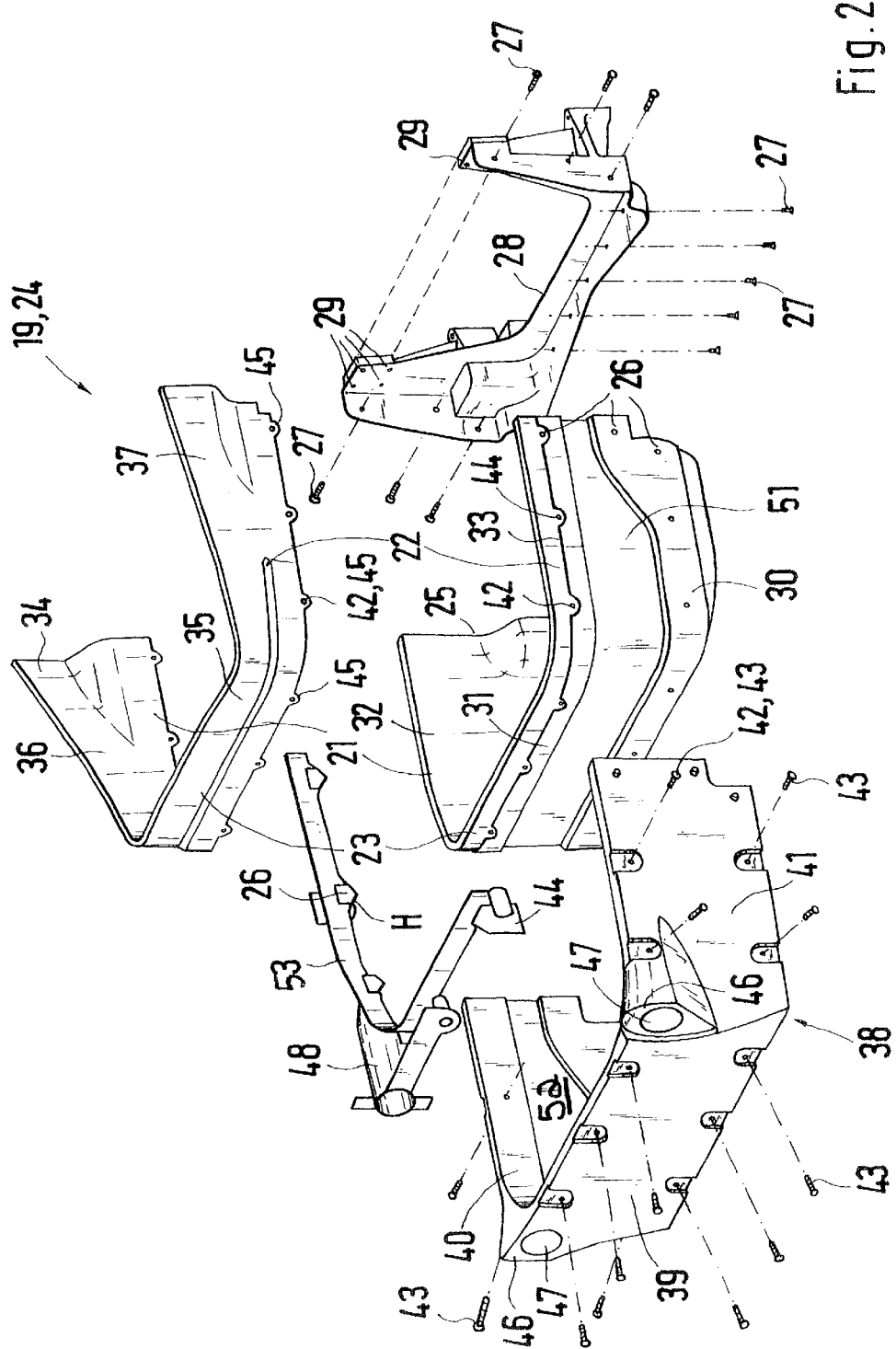
FIG. 2 is an exploded drawing of a multi-part pan, forming the receptacle.

The multi-part pan 19, according to FIG. 2, has a bottom part 30, a front wall part 31 of the front wall 23 and side wall parts 32 and 33 of the side walls 21 and 22. The bottom part 30 can be connected to a headpiece 34, which has a front wall extension 35 and side wall extensions 36 and 37. The bottom part 30 is connected to the headpiece 34 by the U-shaped stiffening element 38. Preferably the stiffening element 38 is made of a fiber reinforced plastic. The base 39 of the stiffening element 38 is assigned to the front wall 23, and the legs 40 and 41 of the stiffening element 38 are assigned to the side walls 21 or 22. Hence, the stiffening element 38 embraces partially the pan 19. Connecting mechanisms 42 are used to connect the bottom part 30, the headpiece 34 and the stiffening element 38. The connecting mechanisms 42 include connecting pins 43, such as screws or rivets, which can be fixed in connecting pin receivers 44 of the connecting mechanisms 42 so that the headpiece 34 and the bottom part 30 are connected by the stiffening element 38. For this connection the headpiece 34 can have links 45, which come to rest between the stiffening element 38 and the bottom part 30 and through which the connecting pins 43 penetrate. The connecting pin receivers 44 are fastened preferably in the bottom part 30. However, they can also be provided in the stiffening element 38 and/or the headpiece 34. Both the connecting pins 43 and the connecting pin receivers 44 are made preferably of a metal material. The above described fasteners 27 or fastening elements 26 can also be used to connect together the parts 30, 34 or 38. Moreover, the fastening elements 26 can also be provided in the stiffening element 38.

The stiffening element 38 and/or the pan 19 has at each corner region a material reinforcement 46. Each reinforcement 46 has a receiver 47 for receiving a metal attachment 48 for fastening the bumper 16 (FIG. 3). A fastening insert 49, which includes a fastening segment 50, can be received in each attachment 48 and/or receiver 47.

FIG. 2 shows that the outside of the bottom part 30 and the inside of the stiffening element 38 have grooves 51 or 52, which form in the assembled pan 19 a channel, into which a holder 53 can be inserted that carries the attachment means 48 and/or the fastening elements 26 and/or the connecting pin receivers 44. The holder 53 can be designed, for example, as an aluminum strip.

FIG. 3 shows a second embodiment of a pan 119, whose floor 20, side walls 21 and 22 and front wall 23 are designed as one piece. The stiffening element 38 can be designed as one piece with the pan 119, or can be attached as shown in FIG. 3 to the pan 119 by the connecting mechanisms 42, described above.

To arrange a locking mechanism for the hood 13, a lock carrier 54, which has a lock receiver 55, is attached to the front wall 23. The lock carrier 54 can have a metal frame and can be mounted on the front wall 23 and possibly on the side walls. In addition, it can carry a seal (not illustrated), which interacts with the inside of the hood 13.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. A motor vehicle, comprising an end region and a receptacle arranged in the end region, the receptacle including a pan made at least partially of a fiber reinforced plastic, wherein the pan functions as an impact deformable element, the motor vehicle further comprising metal attachments for a bumper insertable into the pan, wherein a front wall of the pan has a stiffening element, made of fiber reinforced plastic, and wherein the stiffening element has a U-shape, a base and two legs, and the base is disposed adjacent to the front wall and the two legs are disposed adjacent to side walls of the pan.

2. The motor vehicle, as claimed in claim 1, wherein the end region is the front end.

3. The motor vehicle, as claimed in claim 1, wherein the pan includes a floor, and the floor of the pan is made of the fiber reinforced plastic.

4. The motor vehicle, as claimed in claim 1, wherein the side walls are made of the fiber reinforced plastic.

5. The motor vehicle, as claimed claim 4, wherein the pan has a rear end but does not have a rear wall, and the rear end of the pan is connected to a body of the motor vehicle.

6. The motor vehicle, as claimed in claim 4, further comprising metal fastening elements insertable into the walls of the pan.

7. The motor vehicle, as claimed in claim 6, wherein the fastening elements are connected to the body of a motor vehicle.

8. The motor vehicle, as claimed in claim 4, wherein a floor, the side walls and the front wall of the pan from a unitary part.

9. A motor vehicle, comprising an end region and a receptacle arranged in the end region, the receptacle including a pan made at least partially of a fiber reinforced plastic, wherein the pan functions as an impact deformable element, wherein the pan includes side walls that are made of the fiber reinforced plastic, wherein the floor of the pan includes a bottom part, the front wall includes a front wall part, and each side wall includes a side wall part, wherein the motor vehicle further comprises a stiffening element and a headpiece having a front wall extension and side wall extensions, and wherein the headpiece and the bottom part are connected by the stiffening element.

10. The motor vehicle, as claimed in claim 9, wherein the bottom part, the headpiece and the stiffening element are connected by metal connecting mechanisms.

11. The motor vehicle, as claimed in claim 10, wherein the connecting mechanism has connecting pin receivers and connecting pins, which is fixable in the connecting pin receivers, and wherein the connecting pin receivers are inserted into the bottom part or the stiffening element and in the headpiece or the stiffening element.

12. The motor vehicle, as claimed in claim 1, wherein the plastic is reinforced with carbon fibers.

13. The motor vehicle, as claimed in claim 1, further comprising an intermediate frame, wherein the pan is fastened to a body of the motor vehicle by the intermediate frame using fastening elements.

14. The motor vehicle, as claimed in claim 13, wherein the intermediate frame is made from aluminum casting.

15. The motor vehicle, as claimed in 1, further comprising a body having an approximately vertical wall that closes a rear end of the receptacle.

16. A method of making a motor vehicle, comprising the steps of installing a pan, made at least partially of a fiber reinforced plastic, in an end region of the motor vehicle, and using the pan as an impact deformable element, wherein the pan includes a fiber reinforced plastic front wall adjacent to the end region, a fiber reinforced plastic floor, and fiber reinforced plastic side walls, and wherein the pan further includes a rear end but does not have a rear wall, and the method further comprising connecting the rear end of the pan to a body of the motor vehicle, providing the front wall of the pan with a stiffening element, made of fiber reinforced plastic and providing metal attachments for a bumper insertable into the pan.

17. The method, as claimed in claim 16, further comprising arranging the attachments in at least one of the stiffening element and the front wall.

18. The method, as claimed in claim 17, further comprising disposing a base of the stiffening element forming adjacent to the front wall and disposing two legs of the stiffening element adjacent to the side walls.

19. The method, as claimed in claim 18, further comprising making the floor, the side walls and the front wall of the pan as a unitary part.

20. The method, as claimed in claim 19, wherein the floor of the pan includes a bottom part, the front wall includes a front wall part, and each side wall includes a side wall part, the method further comprises providing a headpiece having a front wall extension and side wall extensions, and connecting the headpiece and the bottom part by the stiffening element.

* * * * *